United States Patent [19]
Tsuyuki

[11] Patent Number: 5,675,492
[45] Date of Patent: *Oct. 7, 1997

[54] DYNAMIC, MULTIPLE-ROUTE NAVIGATION APPARATUS AND METHOD FOR GUIDING A MOVING OBJECT

[76] Inventor: Toshio Tsuyuki, 865-3-352, Kajiya, Yugawaracho, Ashigarashimo-Gun, Kanagawa-Ken, Japan

[*] Notice: The term of this patent shall not extend beyond the expiration date of Pat. No. 5,467,276.

[21] Appl. No.: 443,319

[22] Filed: May 17, 1995

Related U.S. Application Data

[63] Continuation of Ser. No. 150,052, filed as PCT/JP92/00727, Jun. 5, 1992, Pat. No. 5,467,276.

[30] Foreign Application Priority Data

Jun. 5, 1991 [JP] Japan ..................... 3-230743

[51] Int. Cl.⁶ ..................... G06G 7/78; G08G 1/123
[52] U.S. Cl. ..................... 364/449.4; 364/449.3; 364/449.5; 364/449.2; 364/444.2; 340/995; 340/990; 340/988; 73/178 R
[58] Field of Search ..................... 364/444, 449, 364/443, 450, 460, 444.1, 447, 449.1, 449.7, 449.3, 449.5, 449.4, 449.95, 449.2, 444.2, 436, 442, 424.029; 340/990, 995, 988, 460, 686, 905, 996, 933, 937; 342/357, 450, 457; 73/178 R

[56] References Cited

U.S. PATENT DOCUMENTS

| | | | |
|---|---|---|---|
| 5,031,104 | 7/1991 | Ikeda et al. | 364/449.3 |
| 5,172,321 | 12/1992 | Ghaem et al. | 364/444.2 |
| 5,206,811 | 4/1993 | Itoh et al. | 364/449.5 |
| 5,220,507 | 6/1993 | Kirson | 364/444.2 |
| 5,243,528 | 9/1993 | Lefebvre | 364/449.5 |
| 5,270,937 | 12/1993 | Link et al. | 364/449.3 |
| 5,272,638 | 12/1993 | Martin et al. | 364/444.2 |
| 5,285,391 | 2/1994 | Smith, Jr. et al. | 364/443 |
| 5,291,413 | 3/1994 | Tamai et al. | 364/449.4 |
| 5,369,588 | 11/1994 | Hayami et al. | 364/449.3 |
| 5,371,678 | 12/1994 | Nomura | 364/436 |
| 5,412,573 | 5/1995 | Barnea et al. | 364/449.5 |
| 5,467,276 | 11/1995 | Tsuyuki | 364/449.1 |

FOREIGN PATENT DOCUMENTS

| | | |
|---|---|---|
| 41 04 351 | 8/1991 | Germany . |
| 62-66399 | 4/1987 | Japan . |
| 62-155311 | 10/1987 | Japan . |
| 1-130299 | 5/1989 | Japan . |
| 1-180413 | 7/1989 | Japan . |
| WO 92/08952 | 5/1992 | WIPO . |

*Primary Examiner*—Jacques Louis-Jacques
*Attorney, Agent, or Firm*—Oliff & Berridge

[57] ABSTRACT

A navigation apparatus which includes an input section, a central processing section, a display section and a memory section is mounted on a moving object. When an initial or current position and destination of the moving object are provided to the central processing section, the apparatus produces two or more possible routes along which the moving object can move to reach the destination after starting from the current position by using map data stored in the memory section. The initial or current position, destination and possible routes are repeatedly calculated, updated and indicated on a screen of the display section. The two or more possible routes are repeatedly produced by a processor and calculation/retrieval circuitry. A connection route existing between the two or more possible routes may be retrieved and repeatedly indicated. Furthermore, a possible area containing the possible routes may be retrieved and repeatedly indicated.

14 Claims, 4 Drawing Sheets

DYNAMIC, MULTIPLE-ROUTE
NAVIGATION APPARATUS AND METHOD
FOR GUIDING A MOVING OBJECT

This is a continuation of application Ser. No. 08/150,052, filed as PCT/JP92/00727 Jun. 5, 1992, now U.S. Pat. No. 5,467,276.

FIELD OF THE INVENTION

The present invention relates to a navigation apparatus and navigation method, and more particularly, to a navigation apparatus and navigation method for determining routes (or passages) between the present position of a moving object and a destination to be reached by the moving object, along which the moving object can reach the destination, and presenting the STET or routes to a driver through a display to thereby support the journey of the moving object.

BACKGROUND OF THE INVENTION

A conventional navigation apparatus applied, for example, to an automobile can be roughly classified into a route-guiding type apparatus and a non-route-guiding type apparatus.

The route-guiding type navigation apparatus displays information about an optimum route for reaching a destination on a screen of a display device. The optimum route for reaching the destination is automatically calculated by a computer accommodated in the navigation apparatus by inputting the present position and destination of the automobile before starting a journey. While travelling, a driver drives the automobile guided by information about the route displayed on the display screen until the automobile reaches the destination. Nevertheless, the conventional route-guiding type apparatus is impractical because of the difficulty related to the ability of the driver, errors of a locator and timing for indicating the route.

The non-route-guiding type navigational apparatus only displays a map as well as a present position, travelling locus, travelling direction and the like in the map on the screen of the display device and does not positively provide the driver with guiding information. Therefore, this navigation apparatus cannot achieve the original purpose of navigation.

As described above, the information presented by the non-route-guiding type navigational apparatus is less valuable to the driver. Further, the driver is prevented from paying attention to the forward direction of his automobile by observing the map on the screen while driving. Thus a safety problem arises. On the other hand, information presented by the route-guiding type navigational apparatus forces the driver to travel along the designated route, thereby placing strong psychological stress on the driver and thus raises the possibility of causing danger. Further, according to present technology, since an instruction on the route is given to the driver without taking actual traffic conditions while travelling into consideration, a problem arises in that the navigational apparatus is less valuable when practically applied.

Taking the problems of the conventional navigation apparatus into consideration, an object of the present invention is to provide a practical and safe navigation apparatus and navigation method which can present valuable information to a driver without applying stress to him.

SUMMARY OF THE INVENTION

A navigation apparatus and navigation method according to the present invention are arranged as described below.

The navigation or navigational apparatus according to the present invention is mounted on a moving object and includes an input section, a central processing section, a memory section and a display section. When data about the present position and the destination of the moving object are given to the central processing section, the navigational apparatus produces a route along which the moving object can reach the destination by using data, such as a map and the like, stored in the memory section. The central processing section includes a possible route calculation means for determining two or more routes as possible routes when the present position and destination of the moving object are given. The two or more routes are displayed on the display section.

In the above arrangement, it is preferable that the central processing section includes a connection route calculation means for determining a connection route for connecting between the two or more possible routes. The connection route is also displayed on the display section.

In the above arrangement, it is preferable that the central processing section includes a possible area calculation means for determining a possible area defined by the two or more possible routes. Likewise, the possible area is displayed on the display section.

In the above arrangement, it is preferable that the present position detected by the locator of the moving object is treated as a point contained in an area having a predetermined extent by taking errors into consideration and at least any one of the possible routes. The possible area is determined by using a part or all of the routes contained in the area.

The navigation or navigational method according to the present invention comprises the steps of producing two or more possible routes for enabling a user to reach a destination when starting from a present position by using prepared map data when the present position and the destination of a moving object are given, and indicating the present position, the destination and the two or more possible routes to a user, In the above method, it is preferable that a connection route which connects between the two or more possible routes is determined and indicated to the user together with the possible routes.

In the above method, it is preferable that a possible area defined by the two or more possible routes is determined and indicated to the user.

In the above method, it is preferable that the present position of the moving object is treated as a point contained in an area having a predetermined extent and at least any one of the possible routes and the possible area is determined by using a part or all of the routes contained in the area.

DESCRIPTION OF THE PREFERRED EMBODIMENTS

A preferred embodiment of the present invention will be described below with reference to the attached drawings.

Figure 1:
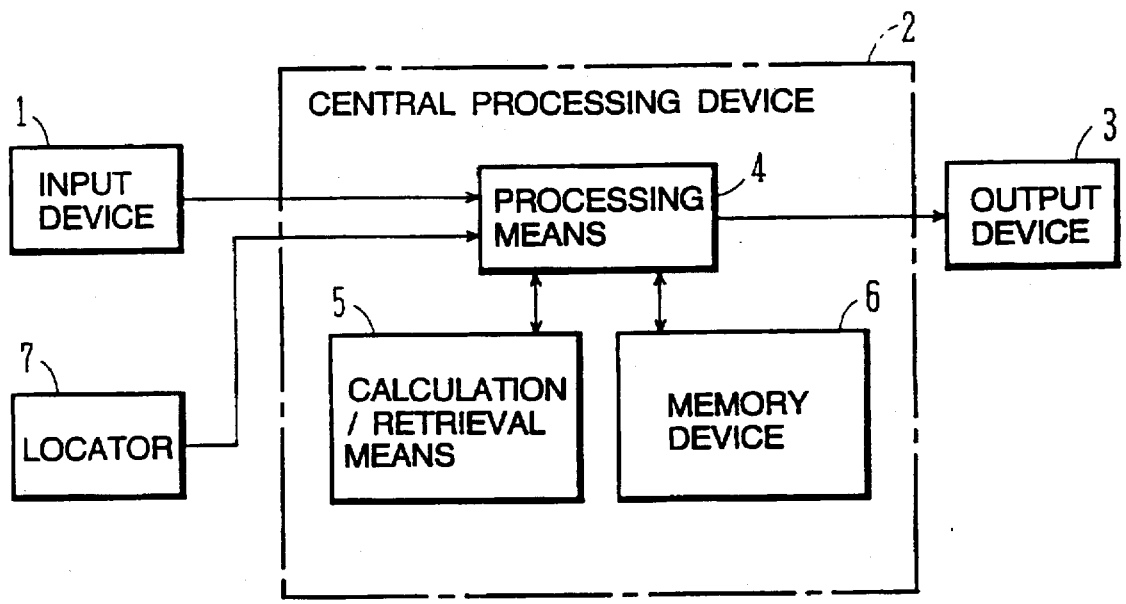
FIG. 1 is a diagram showing the arrangement of an embodiment of a navigation apparatus according to an embodiment of the present invention.

FIG. 1 depicts an input device 1; a central processing device 2; and a display device 3 as an output device. A navigational apparatus according to the present embodiment fundamentally comprises the input device 1, the central processing device 2 and the display device 3. The navigational apparatus having this arrangement is mounted on a moving object such an automobile and the like. The present embodiment will be described assuming that the moving object is an automobile.

The input device 1 is installed in a front panel in the vicinity of a driver's seat in the automobile. Operation keys are disposed on the input device 1 to input various instructions or data. These operation keys are operated by, for example, a driver to input necessary instructions or data. A voice input type input device or a touch screen type device may be employed as the input device 1.

The central processing device 2 is composed of a microcomputer which includes processing means 4, a calculation/retrieval means 5, and a memory device 6. The memory device 6 stores a program for carrying out calculations necessary for performing navigation according to this embodiment and data such as maps, roads and the like necessary for the navigation. The processing means 4 has a processing function realized by the program stored in the memory device 6. The concrete content of the processing performed by the processing means 4 will be described later. The calculation/retrieval means 5 functions to retrieve various kinds of data about the maps or roads stored in the memory device 6 in accordance with instructions from the processing device 4 in order to obtain necessary data.

The display device 3 can be any one of a CRT, a liquid crystal display, head-up display (HUD) on a window shield or the like, and disposed on the front panel or shield glass in the vicinity of the driver's seat. The driver can obtain information necessary for reaching a destination while driving the automobile by visually confirming the content displayed on the screen of the display device 3.

The navigational apparatus includes a locator 7 in addition to the basic arrangement. The locator 7 is used to measure the present position of the automobile on which the navigational apparatus is mounted. Various systems may be employed as the concrete arrangement of the locator 7. That is, there are various systems, such as, an arrangement making use of a radio wave from a satellite; an arrangement making use of a distance sensor or a directional sensor; and an arrangement making use of oscillators disposed along roads to provide positional information, and the like.

Next, the operation of navigation (travelling support) carried out by the navigational apparatus having the arrangement as described above will be explained with reference to FIG. 2. The operation of the navigational apparatus is carried out by various functional means realized by the processing means 4 and the calculation/retrieval means 5.

First, an operation key of the input device 1 is operated so that the destination is set and input to the central processing device 2 (step 11). The destination may be input by any arbitrary method. For example, the destination may be input by inputting a number allocated to it.

Next, the present position of the automobile is set by operating the operation key of the input device 1 and input to the central processing device 2 (step 12). The initial input of the present position at step 12 should be preferably performed by a setting and inputting operation of the driver to ensure the accuracy of the present position.

Further, the present position can be automatically input by fetching an output signal from the locator 7.

The processing means 4 of the central processing device 2 maintains the respective data about the destination and the present position. Next, the processing means 4 determines respective positional data on the basis of the data of the destination and the present position. Then, the calculation/retrieval means 5 is operated so that a route (hereinafter, referred to as a possible route), along which the automobile can travel from the present position to the destination, is calculated on the basis of the respective map data and roads stored in the memory device 6 in addition to coordinate data of the destination and present position. Two or more of the above possible routes are determined and taken out by the calculation/retrieval operation. The calculation/retrieval operation is carried out by the calculation/retrieval means 5 at step 13. Possible route calculation means is realized by the processing means 4 and calculation/retrieval means 5 to carry out step 13 for determining the two or more possible routes.

Next, at step 14, coordinate data of the two or more possible routes determined by the calculation/retrieval means 5 is maintained in the processing means 4 and then further supplied to the display device 3. At this time, the coordinate data about the destination and present position input by the input device 1 is also supplied from the processing means 4 to the display device 3.

The processing means 4 has an image displaying and processing function for displaying a required image on the screen of the display device 3. Therefore, the above various kinds of data supplied to the display device 3 are converted to a form which can be displayed on the screen thereof as figures.

As explained above, the present position, the destination, and the two or more possible routes therebetween are displayed on the screen of the display device 3 in the state that their positional relationship is accurately indicated on the basis of their coordinate data (step 14).

Figure 3:
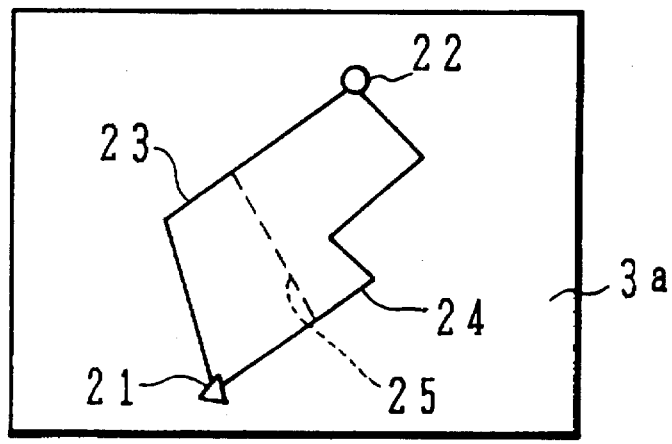
FIG. 3 is a diagram showing an example displayed on the screen of a display section according to an embodiment of the present invention.

FIG. 3 shows an example displayed on the screen of the display device 3. On the display screen 3a, a point indicating the present position of the automobile 21 a point indicating the destination 22; and the possible routes 23, 24 existing between the present position and the destination are indicated. In this example, the two possible routes are displayed.

In the function executed by the calculation/retrieval means 5 to determine the two or more possible routes, it is usually preferable to obtain all the possible routes. However, when there may be many appropriate possible routes between the present position and the destination, it is preferable to select a suitable number of possible routes which are suited for display by adding conditions for such selection. The conditions for the selection includes, for example, a condition for selecting possible routes along which the destination can be reached in a shorter time; a condition for selecting possible routes along which the destination can be reached in a shorter distance; a condition for selecting possible routes along which the destination can be reached by turning to the right and left less times. These conditions can be arbitrarily combined by giving them priority.

Also, it is preferable to select the routes which do not have a directional regulation or other regulation as the possible routes.

Furthermore, when determing the possible routes in the renewal of them, there may be only one possible route. In this case, the display of the possible route on the display device 3 is identical with that effected by the route-guiding type navigation apparatus. Therefore, the display before renewal is maintained. Furthermore, When the only one possible route is a route where it is not required to turn right or left, or a route which has a less complicated traffic condition, or a route which does not cause danger at a crossing point where the automobile must be turned right or left because the locator 7 has a smaller amount of error, this route may be displayed by the renewal.

When information regarding a traffic jam and/or a traffic accident is obtained, a possible route is selected in view of this information. When such information is not obtained, a usual required time is used.

Figure 2:
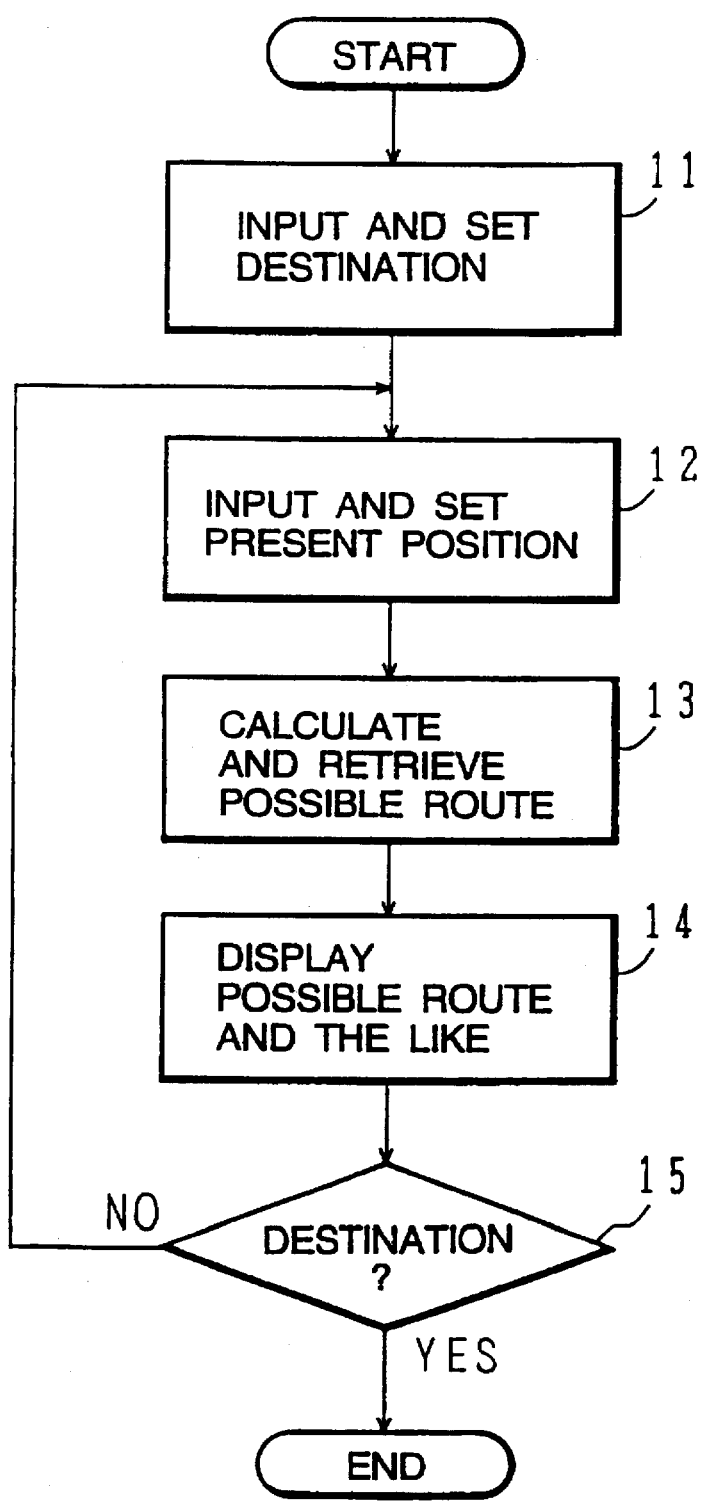
FIG. 2 is a flowchart showing the basic operation for navigation according to an embodiment of the present invention.

Unless the present position of the automobile does not reach the destination, the present position is changed as the automobile travels. When the present position is changed, the possible routes must be determined between a new present position and the destination. Thus, as shown in FIG. 2, it is determined at step 15 whether the present position of the automobile coincides with the destination. In this determining operation, the processing means 4 fetches the present position of the automobile measured by the locator 7 and determines whether this present position coincides with the previously set destination.

When the present position does not coincide with the destination at step 15, the process returns to step 12 at which a new present position from the locator 7 is supplied to the processing means 4. At next step 13, possible routes are calculated/retrieved between the new present position and the destination. Then, the retrieved new possible routes are displayed on the screen of the display device 3 and the possible routes on the screen are renewed at step 14. When new possible routes are not retrieved, the possible routes on the screen are not renewed and maintained as they are.

So long as the present position of the automobile does not coincide with the destination, steps 12 to 15 are repeated, and when the present position coincides with the destination, the operation of the navigation is completed.

The arrangement and the operation of the above navigation apparatus may be modified as described below.

In addition, in calculating/retrieving possible routes at step 13, a route connecting between the possible routes may be also calculated/retrieved. In this case, connection route operation means is realized by the processing means 4 and the calculation/retrieval means 5. The connection route is supplied to the display device 3 together with the possible routes and the like and displayed on the screen thereof. A route 25 shown by a dot-dash line in FIG. 3 shows a connecting route between the possible routes 23 and 24.

When a plurality of possible routes, connection routes, regulated routes are to be displayed on the screen of the display device 3, they are preferably displayed by changing the color or the kind of lines.

When a travelling direction is regulated at many places, or available routes are few, or routes are complicated, in the area adjacent to the destination, it is preferable to prepare the data for first routes leading to the destination and for second routes for allowing the first routes to access to a main route and store the first and second data in the memory device 6 so that the data can be arbitrarily retrieved, or to determine the first and second data by the calculation effected by the processing means 4. This processing is carried out at step 13. The obtained routes are displayed on the screen of the display device 3 together with the possible routes and the connection routes.

Figure 4:
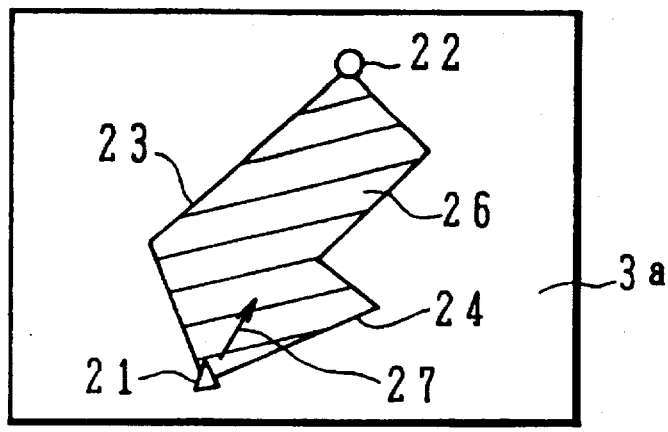
FIG. 4 is a diagram showing another example displayed on the screen of the display section according to another embodiment of the present invention.

Further, a possible area may be calculated/retrieved by the calculation/retrieval effected at step 13. When a lot of possible routes are determined by the calculation/retrieval, the possible area is determined in such a manner that the outermost two possible routes defines the possible area. The possible area is displayed on the screen of the display device 3 instead of all the possible routes. So long as the automobile travels toward the destination within the possible area, it is ensured to reach the destination. In FIG. 4, a possible area 26 is depicted. With respect to the retrieval and display of the possible area 26, it is preferable that when a possible area is initially displayed on the screen by using an initial present position of the automobile, the displayed possible area is maintained on the screen even if the present position is changed. This is because the possible area is a reference area which is used for determining whether the automobile is located within the possible area where it can reach the destination. When it is desired to change a reduced scale, or there are a lot of available routes and therefore it is easy to calculate/retrieve a possible area, the possible area may be of course renewed, if necessary.

In the above description, possible area operation means can be realized by the processing means 4 and the calculation/retrieval means 5.

While travelling, the present position of the automobile is periodically confirmed by making use of an output from the locator 7 at step 12 in order to retrieve the possible routes between a new present position and the destination. Timing for checking the present position is determined, for example, by the timing determined by a predetermined time interval; the timing determined by an output from a sensor for sensing a turning angle of a steering wheel when the automobile turns to the right or left; the timing sensed by a direction sensor when the automobile turns to the right or left; and the like. Furthermore, the driver may renew the possible routes on the display screen by operating the input device 1 while driving, if necessary.

Furthermore, when it is taken into consideration that errors are included in data regarding the present position of the automobile obtained by the locator 7, it is preferable that after determing an area including the present position, two or more possible routes leading to the destination or the possible area or both of them are obtained on the basis of a part or all of the routes included in the area, and they are displayed on the display device 3. The extent of the area is determined by taking the errors of the locator into consideration.

With respect to the contents displayed on the screen of the display device 3, a travelling locus up to the present position, a travelling direction and the like may be displayed thereon in addition to the aforesaid display items. In FIG. 4, an arrow 27 indicates the travelling direction.

Figure 5:
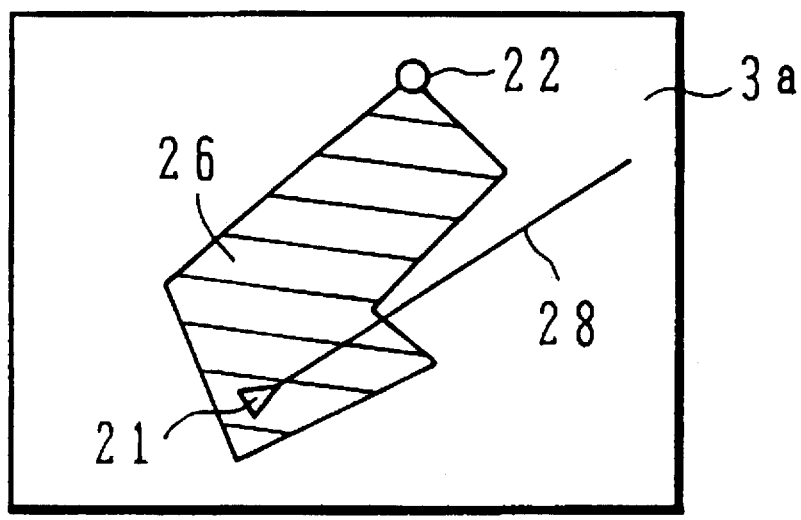
FIG. 5 is a diagram showing a further example displayed on the screen of the display section according to another embodiment of the present invention.

It is preferable that the data displayed on the screen of the display device 3 is designed so that it can be visually confirmed as well. FIG. 5 shows an example of a design concerning the displayed data, wherein a travelling direction 28 is indication. Furthermore, in the display screen, an image to be displayed may be processed so that the upward direction of the image always coincides with the travelling direction. In this case, the image on the screen is subjected to a rotation processing.

Since the displayed routes are difficult to visually, confirm in an area where a lot of routes are available, the present position, the travelling locus, the travelling direction and the like are preferably displayed by changing the color or the kind of lines.

With respect to the display on the screen of the display device 3, a map may be displayed in the possible area or the entire screen as background information in such a degree that the display of the possible routes, possible area and the like does not become obscure, in order to improve the visual interest of the displayed content. Furthermore, the possible routes and the possible area may be displayed by using thick lines or colors to improve the clarity thereof.

Both the present position 21 of the automobile and the destination 22 to be reached are displayed on the screen of the display device 3, as described above. In order to display the present position and the destination on the single screen, an area including both of them must be determined by calculation. This calculation is performed by the processing means 4 and includes, for example, a method of calculating a line segment connecting the present position to the destination and calculating an area to which this line segment belongs; and a method of calculating an area including the coordinate values of the X-axis and Y-axis of both the present position and the destination as an upper limit value and lower limit value.

Furthermore, with respect to the present position and destination on the display screen, it is also possible that both present position and destination are displayed in a wide area and the wide area is divided into four segments, for example. Alternatively, a segment as large as the segment divided into the one fourth portion is established at the center of the wide areas. Numbers are then allocated to the respective segments, and a desired segment specified by a user (by using its number) is enlarged to the screen's full scale so that a suitable, enlarged display can be obtained by repeating this operation.

In addition, a display on a suitable reduced scale may be performed by reversing the above operation.

Furthermore, it is preferable that processing concerning highways and the like, having a specific entrance and exit, is differentiated from that concerning usual roads, and that the respective possible routes and the like are independently determined. Since the shape of highways is simple, no problem arises even if the route-guiding system is employed.

According to the present invention arranged as described above, the following effects can be obtained.

When the present position and the destination of the moving object such as an automobile are input, two or more possible routes along which the moving object may move to reach the destination are displayed on the screen of the display device, and thus the destination can be securely reached on the basis of the plural possible routes used for driving or travelling. In this case, since the two or more possible routes are displayed for guidance, the driver need not strictly follow one route. Furthermore, even if a route with a directional regulation, which imposes a heavy load on a computer for performing navigation control, is not contained in possible routes, the driver may use the route with the directional regulation by travelling from one possible route to another possible route based on his arbitrary decision at a field, and thus the driver can utilize the navigational apparatus with a light heart. Furthermore, one of the two or more possible routes can be selected by a driver who determines the actual conditions of the routes and thus this system includes convenience which satisfies the psychological state of the driver.

When connecting routes are displayed between a plurality of possible routes, the possible routes can be easily changed giving the driver increased driving flexibility.

Furthermore, when the possible area is displayed, since the destination can be reached so long as the moving object travels within the area and information for guiding the driver to the destination is given in the form of the area, stress on the driver is further reduced.

Since the possible area is not displayed as a map but as a figure, a load is not imposed on the driver when visually confirming the figure and, also, a heads-up display on a window shield (HUD) is made possible.

As described above, reducing the psychological burdens on driver reduce the possibility that he may be dropped out from a guided route.

Since the present position of the moving object need not be matched to a route along which the moving object travels in the screen, the mental burden of the driver from the navigational system and designation is reduced as well as is the degree of attention the driver must pay to the screen is eased. Thus, increased driving safety can be ensured.

Furthermore, errors of a locator which have been said to be fatal to a navigational apparatus, are is allowed and even if the present position of the moving object is not strictly measured, the possible routes and the possible area can be presented, and thus a system having high practical applicability can be realized.

Since guidance made by navigation is not concentrated to a less number of limited routes, a problem of jamming can be solved to enable routes to be effectively used.

In sum, the system is used with a moving object such as an automobile for realizing solutions to problems associated with accuracy errors of a locator, for reducing the driving stress on a driver to thereby enable the driver to safely perform driving for increasing the efficiency of routes by preventing the concentrated use of particular routes, and easing traffic jams.

I claim:

1. A navigation apparatus mounted on a moving object and including an input section, a central processing section, and a display section, whereby when an initial position of said moving object and a destination for said moving object are provided to said central processing section through said input section, said central processing section produces at least one route along which said moving object can reach said destination by using map data stored in a memory section, said central processing section comprising:

means for repeatedly obtaining and repeatedly updating a current position of said moving object as said current position varies from said initial position during the movement of said moving object;

possible route operation means for repeatedly calculating and repeatedly updating two or more possible routes from said current position to said destination, even when said moving object departs from a previously calculated possible route, by using data of said current position, said destination, and said map data stored in said memory section, any one of said two or more possible routes connecting said current position and said destination; and means for repeatedly updating and indicating said current position, said destination, and said two or more possible routes on said display section whereby at least one possible route is always provided from said current position to said destination.

2. A navigation apparatus according to claim 1, wherein said central processing section includes connecting route operation means for repeatedly determining a connecting route for connection between said two or more possible routes, said connecting route being indicated on said display section.

3. A navigation apparatus according to claim 2, wherein said central processing section includes possible area operation means for repeatedly calculating a possible area defined by maximum boundaries determined by two or more of said possible routes, said possible area being indicated on the said display section, whereby a user may freely select any possible route contained in said possible area.

4. A navigation apparatus according to claim 3, wherein an area of uncertainty which includes said current position of said moving object is repeatedly calculated, taking into account errors due to location measurement, and any one of said two or more possible routes and said possible area is repeatedly obtained on the basis that a part or all of roads passing through said area of uncertainty may be used as a starting point for said possible routes.

5. A navigation apparatus according to claim 3, wherein at least one possible area obtained by calculations based on prior current positions is kept indicated on said display section whenever said current position changes.

6. A navigation apparatus according to claim 1, wherein an area of uncertainty which includes said current position of said moving object is repeatedly calculated, taking into account errors due to location measurement, and said two or more possible routes are repeatedly obtained on the basis that a part or all of roads passing through said area of uncertainty may be used as a starting point for said possible routes.

7. A navigation apparatus according to claim 1, wherein said central processing section includes possible area operation means for calculating a possible area defined by maximum boundaries determined by two or more possible routes obtained based on the initial position and the destination, said possible area being indicated on said display section, whereby a user may freely select any possible route contained in said possible area.

8. A navigation method comprising the steps of:

calculating two or more possible routes for connecting an initial position and a destination by using prepared map data when said initial position and said destination are provided;

repeating said calculation step to repeatedly calculate and repeatedly update said two or more possible routes by using a current position of said moving object, when said current position is obtained, as said current position varies from said initial position during the movement of said moving object; and repeatedly updating and displaying said current position said destination, and said two or more possible routes to a user whereby at least one possible route is always provided from said current position to said destination, even when said moving object departs from a previously calculated possible route.

9. A navigation method according to claim 8, further comprising the steps of:

repeatedly determining a connecting route for connection between said two or more possible routes; and, repeatedly displaying said connecting route together with said two or more possible routes to the user.

10. A navigation method according to claim 9, further comprising the steps of:

repeatedly determining a possible area the extent of which is defined by maximum boundaries determined by two or more of said possible routes; and repeatedly displaying said possible area to the user whereby the user may freely select any possible route contained in said possible area.

11. A navigation method according to claim 10, wherein an area of uncertainty, which includes said current position of said moving object, is repeatedly calculated, taking into account errors due to location measurement, and any one of said two or more possible routes and said possible area is repeatedly obtained on the basis that a part or all of roads passing through said area of uncertainty may be used as a starting point for said possible routes.

12. A navigation method according to claim 10, wherein at least one possible area obtained by calculations based on prior current positions is kept indicated on said display section whenever said current position changes.

13. A navigation method according to claim 8, wherein said area of uncertainty, which includes said current position of said moving object, is repeatedly calculated, taking into account errors due to location measurement, and said two or more possible routes are repeatedly obtained on the basis that, a part, or all of roads passing through said area of uncertainty may be used as a starting point for said possible routes.

14. A navigation method according to claim 8, further comprising the steps of:

determining a possible area the extent of which is defined by maximum boundaries determined by two or more possible routes obtained based on the initial position and the destination; and displaying said possible area to the user whereby the user may freely select any possible route contained in said possible area.

* * * * *